: 2,909,431
Patented Oct. 20, 1959

2,909,431
GRAVY OR SAUCE MIX

Harold M. Keller, St. Paul, Minn., assignor to General Mills, Inc., a corporation of Delaware No Drawing. Application August 13, 1958
Serial No. 754,728

3 Claims. (Cl. 99—94)

This invention relates to a dry mix for the preparation of gravies and sauces. Gravies and sauces are conventionally made by gelatinizing starch or flour in the presence of water and in the presence of flavoring materials such as the fat left after the cooking of meat. In the preparation of gravies and sauces considerable skill is required to prevent lumping. When starch or a cereal flour is added to hot water there is the immediate tendency for some of the particles at the outside of a mass of starch or cereal flour to become gelatinized and thus prevent the penetration of the water into the interior of the mass of starch or cereal. The result is a number of lumps of substantial size composed of dry flour or cereal on the inside surrounded by a gelled coating. It is, therefore, generally required to separate these gelled masses by straining.

In order to overcome this lumping, the starch or cereal is commonly dispersed in cold water and this dispersion is then gradually heated to the boiling point with constant agitation to prevent any lumping during the gelatinization process. Even this procedure is quite tedious and not always successful in preventing lumping.

It has now been discovered that it is possible to prepare a dry mix composition which may be used for the preparation of gravies and sauces without the disadvantages attendant the prior art methods. The composition of the present invention may be added even to boiling water without the formation of lumps, even with only a minor amount of stirring.

It is, therefore, an object of the present invention to provide a novel dry mix for the preparation of gravies and sauces which is readily dispersible in water without the risk of formation of lumps.

The dry mix of the present invention is composed of only three fundamental ingredients: (1) A cereal material, such as starch or a cereal flour. (2) A separating medium for the cereal or starch particles; this may be a shortening material, non-fat milk solids, or whey solids. (3) Leavening ingredients; by the use of leavening ingredients, gases are evolved which tend to disrupt any masses of cereal material present and to effect dispersion of individual particles in the aqueous medium.

For the starch or cereal component there can be used any of the materials which have been conventionally used in the past for the production of sauces and gravies. These include a wide variety of starches such as corn, potato, rice, wheat, tapioca and the waxy maize starches. In place of these isolated starches one can use the flours derived from these sources, including wheat flour, rice flour, potato flour, and the like. The starch or cereal material is generally employed in a quantity from about 65% to about 85% based on the total weight of these three components.

The separating material, generally shortening, is preferably used in a quantity of from 5% to 15%. The component appears to serve the purpose of keeping the individual starch or flour particles separated and thus reduces the opportunity for the formation of gel masses. The shortening may be used in the form of a liquid oil or hydrogenated vegetable shortening or animal fat. The shortening should be rather thoroughly distributed on the flour, so as to separate the individual flour particles and to produce a generally free-flowing mixture. In place of an ordinary plastic fat it is possible to use so-called dry shortenings which are combinations of shortening with non-fat milk solids. Generally these dry shortenings are in the free-flowing form and require mere admixture with the remaining ingredients of the mix. In place of shortening materials it is possible to use other materials, such as non-fat milk solids or whey solids, to effect a separation of the individual starch or flour particles. All of these materials are used in the proportions stated above, namely 5% to 15% based on the total weight of these three basic components.

The leavening may be used in the ratio from 10% to 20% by weight, based on the total weight of the three fundamental components of the mix. Any type of leavening may be used, including mixed leavening materials. These leavenings are generally composed of an alkaline component, such as soda, in combination with an acid component, generally sodium acid pyrophosphate, or monocalcium phosphate, or dicalcium phosphate. It is usually preferred to employ either monocalcium phosphate or sodium acid pyrosposphate in combination with dicalcium phosphate. The monocalcium phosphate and the sodium pyrophosphate are relatively reactive at low temperatures and, accordingly, some dispersion is effected even before the water temperature becomes very high. Sodium pyrophosphate is slightly preferred because of its better storage stability, especially when the cereal material is not dried below its normal equilibrium moisture content. The dicalcium phosphate is a desirable component in that it is slower acting and will tend to disperse any small lumps which are not broken up initially by the fast-acting leavening components. A preferred composition is one containing approximately 70% cereal, 20% leavening, and 10% shortening.

In the following examples, the mix products were converted into gravies by a standard procedure which consisted of one cup of water and 1 tablespoon of fat to boiling after which 2 tablespoons of the mix was added and stirred slightly to prevent burning. The stirring was not vigorous enough to break up any lumps if formed. The leavening was relied on as the sole means of dispersing the mix and to break up any lumps that tended to form initially.

Example 1

A series of mixes were prepared containing 70% cereal, 20% leavening and 10% of a dry, powdered shortening. One contained wheat starch as the cereal material, another contained potato flour, and a third contained rice flour. All dispersed without the formation of lumps. The wheat starch product dispersed somewhat more slowly and had a pudding-like consistency when cooled. The potato flour product dispersed readily and had a delightful potato odor and a tan color. The rice flour product dispersed the best. The rice flour employed was a fairly coarse granulation, which aided dispersion.

Example 2

A series of dry mixes were prepared, all containing 20% leavening; one with 5% shortening and 75% flour, another with 10% shortening and 70% flour, and third with 15% shortening and 75% flour. The one with the 5% shortening had a slight tendency to form lumps initially, but these lumps disappeared upon continued cooking and without vigorous agitation. The product with the 10% shortening effected a very desirable dispersion rapidly, and no lumps were formed. The product with the 15% shortening dispersed very nicely without lump formation, but the product was somewhat greasy initially in the dry form, and would be somewhat less desirable than the product containing the 10% shortening, since it would not readily lend itself to use in a shaker.

*Example 3*

A series of mixes were prepared, all of which contained 10% of a powdered shortening. The quantity of leavening was varied, as indicated in the following table, and the balance of the product was made up of wheat flour as the cereal fraction. All of these products were dispersed in water and cooked in the manner described and all dispersed ultimately without lumping, although there may have been some slight lumping initially during the cooking operation. The description of the leavening components in each of these tests is indicated in the following table.

| Mix No. | Leavening Component |
|---|---|
| 1 | 5% Sodium Acid Pyrophosphate Leavening. 5% Dicalcium Phosphate Leavening. |
| 2 | 7.5% Sodium Acid Pyrophosphate Leavening. 5% Dicalcium Phosphate Leavening. |
| 3 | 7.5% Sodium Acid Pyrophosphate Leavening. 7.5% Dicalcium Phosphate Leavening. |
| 4 | 10% Sodium Acid Pyrophosphate Leavening. 7.5% Dicalcium Phosphate Leavening. |
| 5 | 7.5% Sodium Acid Pyrophosphate Leavening. 10% Dicalcium Phosphate Leavening. |
| 6 | 5% Sodium Acid Pyrophosphate Leavening. 10% Dicalcium Phosphate Leavening. |
| 7 | 10% Sodium Acid Pyrophosphate Leavening. |
| 8 | 15% Sodium Acid Pyrophosphate Leavening. |
| 9 | 10% Sodium Acid Pyrophosphate Leavening. 10% Dicalcium Phosphate Leavening. |

*Example 4*

A series of dry mixes were prepared containing leavening at a level of 20%. Whey solids were used, at levels of 5%, 10%, and 15%, with the cereal ingredient wheat flour employed to make up the balance. These products dispersed readily and were as effective as the examples embodying shortening. All of these products were very free flowing in the dry form, even at the higher levels of whey solids. In fact, it is possible to exceed the 15% limit of this component when either whey solids or non-fat milk solids are employed. At these higher levels, however, the amount of flour is decreased to the extent that more product is needed in order to obtain the correct consistency for the gravy or sauce.

*Example 5*

Example 4 was duplicated substituting non-fat milk solids for the whey solids. The products were almost as effective as those employing the whey solids.

It is evident from the above examples that the dry mix of the present invention provides an efficient way of producing gravies and sauces by the inexperienced without the difficulty attendant the prior art method. While the examples have been described with the fundamental components, namely the cereal, the leavening, and the shortening components, it will be evident that it is possible to add additional components, such as flavors and the like. As an alternative, these may be added at the time the finished gravy or sauce is prepared.

It should be pointed out that in the examples, the mixes were tested by addition to boiling water as this is a very severe test of the tending toward lumping. In actual use it may be preferable to add the mixes to hot water somewhat below the boiling point for improved results.

I claim:

1. A dry mix preparation for the production of gravies and sauces comprising from 65% to 85% of finely divided cereal material, 10% to 20% of leavening, and from 5% to 15% of a separating component selected from the group consisting of shortening, non-fat milk solids, and whey solids.

2. A product according to claim 1 in which the separating material is a free-flowing shortening.

3. A dry mix preparation for the production of gravies and sauces comprising approximately 70% of a finely divided cereal material, approximately 20% of leavening material, and approximately 10% of shortening.

References Cited in the file of this patent

UNITED STATES PATENTS

| | | |
|---|---|---|
| 269,743 | Thorpe | Dec. 26, 1882 |
| 1,105,638 | Estabrook | Aug. 4, 1914 |
| 2,554,143 | Hinz et al. | May 22, 1951 |